United States Patent [19]

Ishii et al.

[11] Patent Number: 4,807,530

[45] Date of Patent: Feb. 28, 1989

[54] EXPANSIVE DEMOLITION AGENT

[75] Inventors: Shiro Ishii, Zushi; Hachiro Kubota, Tokyo; Toshiharu Hida, Koshigaya; Junichiro Migita, Yokohama, all of Japan

[73] Assignee: Onoda Cement Co., Ltd., Japan

[21] Appl. No.: 131,264

[22] Filed: Dec. 9, 1987

Related U.S. Application Data

[63] Continuation of Ser. No. 916,215, Oct. 7, 1986, abandoned.

[30] Foreign Application Priority Data

Oct. 14, 1985 [JP] Japan ................................. 60-226989

[51] Int. Cl.⁴ ............................................. F42B 13/44
[52] U.S. Cl. .................................... 102/333; 102/312; 102/313; 299/13
[58] Field of Search ....................... 102/312, 313, 333; 89/1.14; 166/292; 299/13

[56] References Cited

U.S. PATENT DOCUMENTS

| 3,866,683 | 2/1975 | Maly et al. ........................ 166/292 |
| 3,866,684 | 2/1975 | Friedman ....................... 166/292 X |
| 3,944,201 | 11/1976 | Bendler et al. ...................... 89/1.14 |
| 4,253,523 | 3/1981 | Ibsen ............................ 102/310 X |
| 4,586,438 | 5/1986 | Coursen et al. ..................... 102/313 |

*Primary Examiner*—Peter A. Nelson
*Attorney, Agent, or Firm*—Jordan B. Bierman

[57] ABSTRACT

An expansive demolition agent prepared by crushing a clinker for manufacturing powdered expansive demolition agent obtained by sintering, which is capable of hydrating and expanding in a hole drilled in a brittle material to demolish the brittle material, the maximum particle diameter of the agent being one-third or less the diameter of the hole, and containing 10% or less of fine particles having a particle diameter of 0.3 mm or less.

9 Claims, No Drawings

EXPANSIVE DEMOLITION AGENT

This Application is a continuation of Application Ser. No. 916,215, filed Oct. 7, 1986 which claims the priority of Japanese 226,989/1985, filed Oct. 14, 1985.

BACKGROUND OF THE INVENTION

This invention relates to an expansive demolition agent to be used for demolishing brittle materials such as boulders, bedrocks or concrete.

Heretofore, a method for demolishing brittle materials such as boulders, bedrocks or concrete has been known, in which a hole is drilled in a brittle material, and the hole is poured with a slurry prepared by mixing a powdered expansive demolition agent and water, to demolish the brittle material utilizing an expansive pressure generated by the hydration of the powdered expansive demolition agent. The powdered expansive demolition agent used has been prepared by pulverizing a clinker for manufacturing the powdered expansive demolition agent to Blaine specific surface areas of 2,000 to 2,500 $cm^2/g$. The resulting powdered expansive demolition agent is previously mixed with water to obtain a slurry, which is used to pour into the hole drilled in the brittle material. However, this method has the following problems.

(1) The powdered expansive demolition agent must be weighed and mixed immediately prior to applying the slurry, thus requiring a complex work.

(2) If the slurry of the powdered expansive demolition agent is kept standing as it is, the hydration reaction proceeds to generate dangerous heat.

(3) For a large hole diameter or at a high working temperature, the hydration heat generated by the hydration reaction accumulates within the hole to produce water vapor from the component water in the slurry, and the slurry can dangerously be blown out of the hole opening by the vapor pressure.

(4) When the brittle body to be demolished is in a river or sea, or if the hole is filled with water due to water spring in the hole or rainfall after drilling the hole, the slurry in the hole is diluted with water and an effective expansive pressure cannot be developed. Then, a bag such as of polyethylene must be previously inserted in the hole, and the slurry must be poured into the bag, thus requiring a further complex work. Even by the method, underwater or undersea demolishing is difficult.

(5) Demolishing a brittle material using the slurry based on the powdered expansive demolition agent, mixed with water, requires a period of 10 to 20 hours because its reaction time is adjusted in view of safety. Thus, it requires a longer time than other demolishing methods using explosives or heavy machines. This results in an increased working period or a waiting time of workers, thus leading to inferior economy.

(6) If, in order to shorten the demolition time, a hydration accelerator such as calcium chloride is added to the powdered expansive demolition agent, or the particle size of the powdered expansive demolition agent is further decreased, the hydration reaction is excessively accelerated to accumulate the hydration heat, which tends to blow out the slurry, thus further increasing danger.

To eliminate such disadvantages, the powdered expansive demolition agent has been pressure-molded by a bricket machine or a roll press, and further processed into particles within a certain range of particle size to produce a pressure-molded powdered expansive demolition agent. The pressure-molded powdered expansive demolition agent has been used to pour into the hole, and water has been poured into the hole to demolish it.

The above described pressure-molded powdered expansive demolition agent, however, has the following problems when used for demolishing brittle materials.

(1) Since the pressure-molded powdered expansive demolition agent is prepared by molding under pressure, and then adjusting its particle size within a certain range by a granulating machine, it requires a complicated production process and is high in cost.

(2) Since there is a limit in the molding pressure and the resulting particles have a limited strength, it tends to break into fine powder during transportation and storage.

(3) With an increased content of fine powder, water penetration into the powdered demolition agent after pouring into the hole is disturbed, and water will not penetrate over the entire agent, or when pouring into a hole which is previously poured with water, the fine powder will be concentrated in the upper layer of the agent, resulting in uneven pouring and uneven development of expansive pressure.

(4) An increased content of fine powder reduces voids between particles, which makes water vapor generated by the hydration heat difficult to flow out, thereby causing danger of blowing-out.

(5) The pressure-molded powdered expansive demolition agent is easily broken when contacting with water, which pours into initially existing voids between particles and makes water vapor difficult to flow out, thereby causing danger of blowing-out.

(6) There is a method, to prevent blowing-out of the agent, in which the amount of water added is decreased to below a certain level to reduce contact of water with the powdered demolition agent in order to leave the voids unfilled. However, this results in incomplete hydration of the powdered demolition agent due to an insufficient amount of water, and hence, an expansive pressure necessary for demolishing cannot be obtained.

SUMMARY OF THE INVENTION

With a view to obviate all of the prior art defects of powdered expansive demolition agent, it is a primary object of the present invention to provide an expansive demolition agent, which is easy to produce and use, has a good workability, with no danger of blowing-out, and provides a large demolishing force.

In accordance with the present invention which attains the above object, there is provided an expansive demolition agent capable of hydrating and expanding in a hole drilled in a brittle material to demolish the brittle material, prepared by crushing a clinker for manufacturing powdered expansive demolition agent obtained by calcination or sintering, the maximum particle diameter of the agent being one-third or less the hole diameter, and containing 10% or less of fine particles having particle diameters of 0.3 mm or less.

Detailed Description of the Invention

The clinker for manufacturing the powdered expansive demolition agent, which has a high hardness and used in the present invention, is prepared by one or more materials selected from the group consisting of clay containing such components as silicon oxide ($SiO_2$), aluminum oxide ($Al_2O_3$), ferric oxide ($Fe_2O_3$)

and magnesium oxide (MgO), and calcium sulfate (CaSO4). The crushed material of the clinker has a hardness of 15 weight percent or less, preferably 10 weight percent or less, based on the total weight abrasion loss of particles 2.5 to 5 mm in particle diameter randomly sampled from the expansive demolition agent passing through a 0.6 mm sieve, measured in accordance with Japanese Industrial Standards (JIS) A 1121 "Method of Test for Abrasion of Course Aggregate by Use of the Los Angeles Machine". For using limestone alone, it is sintered at a temperature of 1,300 to 1,400 degrees C. for a period of 10 to 40 hours to obtain quicklime. For using limestone and clay, a mixture consisting of 90 to 97 weight % of limestone and 3 to 10 weight % of clay is sintered at a temperature of 1,350 to 1,500 degrees C. for 3 to 10 hours. For using limestone and calcium sulfate, a mixture of 90 to 97 weight % of limestone and 3 to 10 weight % of calcium sulfate is sintered at a temperature of 1,300 to 1,400 degrees C. for 3 to 4 hours. For using limestone, clay and calcium sulfate, a mixture of 85 to 95 weight % of limestone, 4 to 12 weight % of clay, and 1 to 10 weight % of calcium sulfate is sintered at a temperature of 1,350 to 1,450 degrees C. for 2 to 4 hours. The resulting clinker for manufacturing powdered expansive demolition agent is then crushed to obtain the expansive demolition agent according to the present invention.

The clinker for manufacturing powdered expansive demolition agent can be added with hydration accelerators including chlorides such as calcium chloride, sodium chloride and potassium chloride, nitrates such as calcium nitrate, sodium nitrate and potassium nitrate, and carbonates such as sodium carbonate and potassium carbonate, as required. Further, these hydration accelerators can be added to the expansive demolition agent according to the present invention. The hydration accelerators are added preferably in amounts of 0.2 to 5 weight %.

Since the expansive demolition agent according to the present invention is prepared by crushing the rigid clinker for manufacturing powdered expansive demolition agent obtained by sintering, it consists of rigid particles that will not destruct during transportation or storage. The expansive demolition agent according to the present invention has a maximum particle diameter of one-third the diameter of the hole drilled in the brittle material to be demolished and contains fine powder with particle diameters of 0.3 mm or less in amounts of 10 weight % or less, preferably 5 weight % or less, to the total weight of the agent, or more preferably free of such fine powder. If the maximum particle diameter of the expansive demolition agent exceeds one-third the hole diameter, clogging occurs in the hole and the hole cannot be satisfactorily poured with the agent. If the amount of the fine powder exceeds 10 weight % of the total weight of the agent, the proportion of voids between the particles when pouring into the hole is reduced, which tends to cause a blowing-out phenomenon of the agent.

The expansive demolition agent according to the present invention preferably has a volume ratio, that is the proportion in volume shared. By the expansive demolition agent when pouring into the hole, of 0.35 to 0.48. The range of volume ratio has been determined based on the test results for demolishing strengths and blowing-out phenomena with the expansive demolition agent according to the present invention having different particle sizes, and it has been found that pouring amounts of 1.2–1.6 kg/liter exhibit sufficient demolishing forces with no occurrence of blowing-out phenomena. Thus, in consideration of the fact that the average specific gravity of the expensive demolition agent is 3.1 to 3.4, the volume ratio should be 0.35 to 0.48, preferably 0.41 to 0.46.

As described above, the expansive demolition agent according to the present invention has a high hardness. The hardness is 15 weight % or less, preferably 10 weight % or less, to the total weight in abrasion loss of particles of 2.5 to 5 mm in particle diameter randomly sampled from the expansive demolition agent passing through a 0.6 mm sieve, measured in accordance with Japanese Industrial Standards (JIS) A 1121 "Method of Test for Abrasion of Coarse Aggregate by Use of the Los Angeles Machine". If the abrasion loss exceeds 15 weight %, the expansive demolition agent is liable to be destructed during handling, resulting in increased content of fine powder and weak competition in hydration reaction between coarse particles and, in turn, insufficient development of expansive pressure.

Test results in the abrasion loss will be shown below.

SAMPLES

Sample A: A clinker is obtained by sintering limestone at a temperature of 1,350 degrees C. for a period of 24 hours, and the resulting clinker is crushed by a jaw crusher to particle diameters of 2.5 to 5 mm.

Sample B: A clinker is obtained by sintering a powder mixture of 88 weight % of limestone, 10 weight % of clay, and 2 weight % of gypsum at a temperature of 1,450 degrees C. for a period of 2.5 hours, and the resulting clinker is crushed by an impeller breaker to particle diameters of 2.5 to 5 mm.

Comparison sample: A powder obtained by pulverizing the same clinker as in B above to a Blaine specific surface area of 2,500 cm$^2$/g is pressure-molded by a 3 metric tons/cm roll press to granules of 2.5 to 5 mm in particle diameter.

TEST METHOD 5 kg each of the above samples is placed in the Los Angeles Machine and rotated for 500 turns. The treated sample is tested for the weight ratio passing through a 0.6 mm sieve and that passing through a 0.3 mm sieve to the total weight of each sample.

The test results are shown below.

|  | 0.6 mm sieve passed | 0.3 mm sieve passed |
| --- | --- | --- |
| Sample A | 9.9% | 6.4% |
| Sample B | 5.0% | 2.9% |
| Comparison sample | 63.1% | 38.2% |

As shown above, the expansive demolition agent according to the present invention produces an adequate amount of voids when pouring into a hole drilled in a brittle material, and since the agent has a sufficient hardness, the voids exist even in the initial stage of hydration and water vapor generated by the hydration heat is allowed to flow out, thereby eliminating danger of blowing-out. Thus, the expansive demolition agent according to the present invention is possible to have an enhanced hydration rate, thereby obtaining increased demolishing force by rapid expansion in a short time.

Since hydration reaction of expansive demolition agents is affected by temperature, the above described hydration accelerators are required to be added at lower temperatures or for a small hole diameter where a large portion of hydration heat dissipates. At an atmospheric temperature of 5 degrees C., for example, heat dissipation area per unit amount of the expansive demolition agent in a hole of 40 mm in diameter is twice that for a hole of 80 mm in diameter, and hydration heat is dissipated easier. Thus, the maximum exothermic temperature is 180 degrees C. for the the 80 mm diameter hole, whereas 80 degrees C. for the 40 mm diameter hole. When the expansive demolition agent added with 2 weight % of $CaCl_2$ is used in the 40 mm diameter hole, the maximum exothermic temperature is increased up to 120 degrees C., thereby demolishing the brittle material in 20 minutes.

Further, the expansive demolition agent according to the present invention is normaly mixed with water and charged into the hole. However, it can also be poured into the hole and then added with water. Moreover, it can be poured into a hole which is previously filled with water. Thus, it can be used where water springs in the hole, or the hole is filled with water by rainfall, or in underwater or undersea brittle materials. For these cases, the expansive demolition agent can be charged as it is with good workability and a sufficiently large demolishing force can be obtained.

As described above in detail, the expansive demolition agent according to the present invention is easy to manufacture and low in cost, and provides an improved workability for use, with no danger of blowing-out, and a large demolishing force in a short time. The expansive demolition agent itself has a high strength and is less liabel to break during transportation and storage. Thus, it provides consistent water penetration and development of demolishing force.

DESCRIPTION OF THE PREFERRED EMBODIMENTS

Preferred embodiments of the present invention will now be described in detail in comparison with other examples.

FIRST EMBODIMENT

Limestone was calcined at a temperature of 1,350 degrees C. for a period of 24 hours to obtain a clinker, which was passed through a 5 mm sieve. Fine particles in the sieved clinker were removed through a 0.3 mm sieve to obtain an expansive demolition agent, which had an abrasion loss of 9.9 weight %.

The expansive demolition agent was poured into a hole with a diameter of 40 mm and a depth of 50 cm drilled at the top center of a 60 cm cube of unreinforced concrete, with a filling density of 1.4 kg/liter and a volume ratio of 0.42. Then, the hole was poured with water up to the hole opening. The test specimen could be demolished into three blocks in 15 minutes with no occurrence of blowing-out.

For comparison, the same test concrete specimen was poured with a slurry prepared by mixing a commercial expansive splitting agent powder, produced by Onoda Cement Co., Ltd. and tradenamed "Bristar", having a Blaine specific surface area of 2,500 $cm^2g/$, with 30 weight % of water. The comparison slurry required a period of 8 hours to demolish the concrete specimen into four blocks.

SECOND EMBODIMENT

A mixture consisting of 88 weight % of limestone, 10 weight % of clay and 2 weight % of gypsum was sintered at a temperature of 1,450 degrees C. for a period of 2.5 hours to obtain a clinker, which was then crushed by an impeller breaker. The crushed clinker was passed through a 15 mm sieve. Fine particles in the sieved clinker were removed through a 0.3 mm sieve to obtain an expansive demolition agent, which had an abrasion loss of 5.0 weight %.

The expansive demolition agent was poured into holes with a diameter of 45 mm, spaced 60 mm, drilled at 50 cm from the free surface of a granite bench, with a filling density of 1.38 kg/liter and a volume ratio of 0.43. Then, the holes were immediately poured with water up to the hole openings. After 20 minutes, a crack began to occur, which attained a width of 5 mm after one hour.

For comparison, the above clinker was pulverized to a Blaine specific surface area of 2,500 $cm^2/g$ and molded by a 3 metric tons/cm roll press to obtain particles of 15 to 0.3 mm in size, which had an abrasion loss of 63 weight %. The pressure-molded particles were poured into the same holes as above, and the holes were poured with water. After filling with water, the pressure-molded particles were broken into a paste with voids clogged, which then blew out.

We claim:

1. An expansive demolition agent, for insertion into a hole in a brittle material, comprising a sintered clinker which has been crushed to a first powder having a maximum particle diameter which is one third or less the diameter of said hole, and containing 10% or less fine particles having a diameter of 0.3 mm or less, an abrasion loss, of randomly sampled particles having 2.5 to 5 mm particle diameter, being such that the amount of said sampled particles passing through a 0.6 mm sieve is 15% or less of the total weight of said expansive demolition agent, when subjected to a test in accordance with Japanese Industrial Standards (JIS) A 1121 "Method of Test for Abrasion of Coarse Aggregate by Use of the Los Angles Machine", whereby said agent is adapted to hydrate and expand in said hole, thereby demolishing said brittle material.

2. An expansive demolition agent produced by sintering a clinker, crushing said clinker to form a first powder, wherein the maximum particle diameter is one third or less the diameter of said hole, and containing 10% or less fine particles having a diameter of 0.3 mm or less, an abrasion loss, of randomly sampled particles having 2.5 to 5 mm particle diameter, being such that the amount of said sampled particles passing through a 0.06 mm sieve being 15% or less of the total weight of said expansive demolition agent, when subjected to a test in accordance with Japanese Industrial Standards (JIS) A 1121 "Method of Test for Abrasion of Coarse Aggregate by Use of the Los Angeles Machine", whereby said agent is adapted to hydrate and expand in said hole, thereby demolishing said brittle material.

3. A method of demolishing a brittle material comprising inserting an expansive demolition agent into a hole in said brittle material; and hydrating said agent to cause expansion thereof, wherein said agent comprises a sintered clinker which has been crushed to a first powder having a maximum particle diameter which is one third or less the diameter of said hole, and containing 10% or less fine particles having a diameter of 0.3 mm or less, an abrasion loss, of randomly sampled particles having 2.5 to 5 mm particle diameter, being such that the amount of said sampled particles passing through a 0.6 mm sieve being 15% or less of the total weight of said expansive demolition agent, when subjected to a test in accordance with Japanese Industrial Standards (JIS) A 1121 "Method of Test for Abrasion Coarse Aggregae by Use of the Los Angeles Machine", whereby said agent is adapted to hydrate and expand in said hole, thereby demolishing said brittle material.

4. The method of claim 3 wherein said agent comprises quicklime or limestone.

5. The demolition agent of claim 1 wherein said clinker comprises quicklime or limestone.

6. The demolition agent of claim 5 wherein said clinker further comprises a material taken from the class consisting of clay, silicon dioxide, aluminum oxide, ferric oxide, magnesium oxide, and calcium sulfate.

7. The demolition agent of claim 4 wherein said clinker further comprises a material taken from the class consisting of clay, silicon dioxide, aluminum oxide, ferric oxide, magnesium oxide, and calcium sulfate.

8. The demolition agent of claim 2 wherein said clinker comprises quicklime or limestone.

9. The demolition agent of claim 8 wherein said clinker further comprises a material taken from the class consisting of clay, silicon dioxide, aluminum oxide, ferric oxide, magnesium oxide, and calcium sulfate.

* * * * *

UNITED STATES PATENT AND TRADEMARK OFFICE
CERTIFICATE OF CORRECTION

PATENT NO. : 4,807,530
DATED : 02/28/89
INVENTOR(S) : ISHII, et al

It is certified that error appears in the above-identified patent and that said Letters Patent is hereby corrected as shown below:

Claim 2, line 8, change "0.06" to --0.6--.

Signed and Sealed this

Nineteenth Day of September, 1989

Attest:

DONALD J. QUIGG

Attesting Officer

Commissioner of Patents and Trademarks